Aug. 18, 1925.
C. LORENZEN
1,550,085
TWO-STROKE ENGINE
Filed March 5, 1924
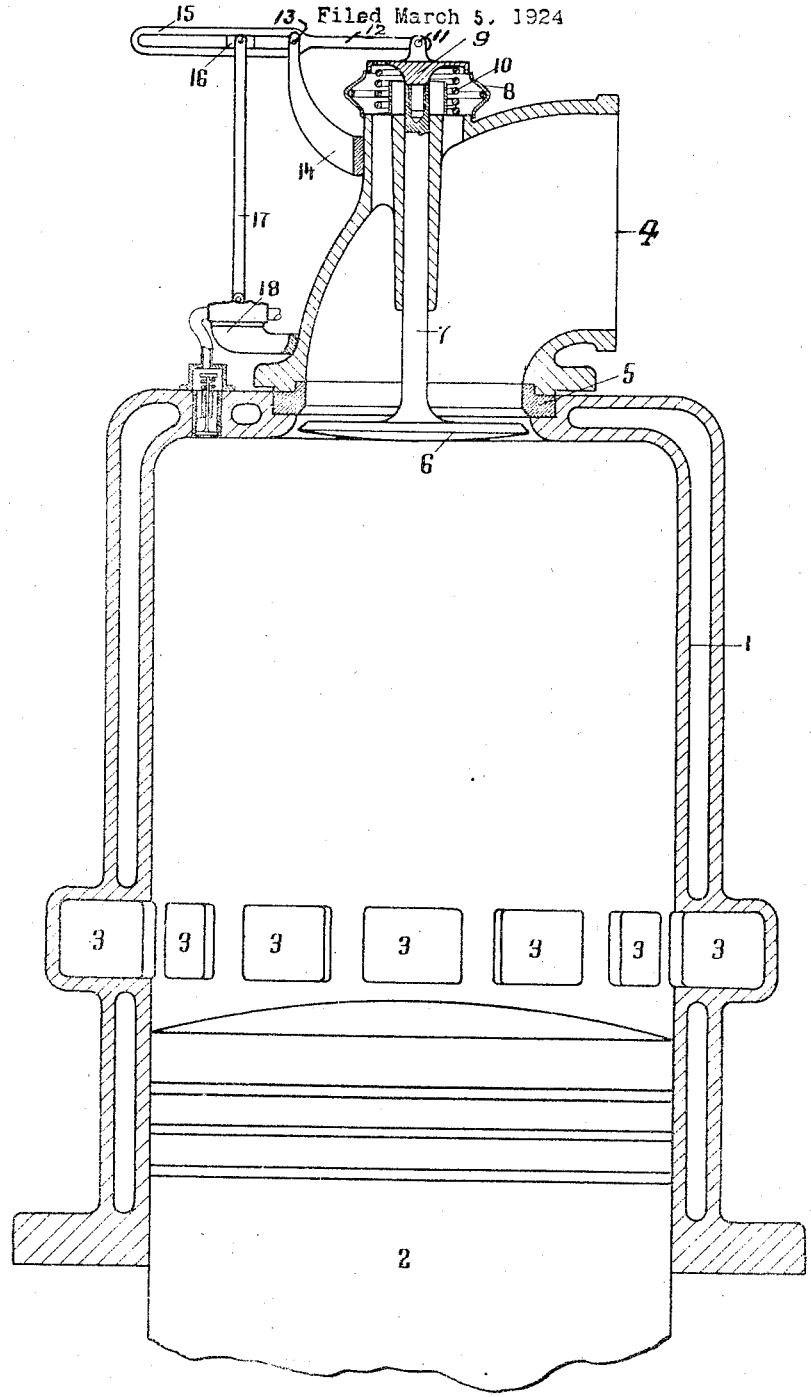
Inventor
CHRISTIAN LORENZEN
Attorney
Francis E Boyne Patented Aug. 18, 1925.

UNITED STATES PATENT OFFICE.

CHRISTIAN LORENZEN, OF BERLIN-NEUKOLLN, GERMANY.

TWO-STROKE ENGINE.

Application filed March 5, 1924. Serial No. 696,953.

*To all whom it may concern:*

Be it known that I, CHRISTIAN LORENZEN, a German citizen, resident of Berlin-Neukolln, Germany, have invented certain new and useful Improvements in or Relating to Two-Stroke Engines, of which the following is a specification.

The problem of the two-stroke engine depends essentially upon the fact that after combustion the burnt gases are expelled from the cylinder and the latter supplied with fresh combustion air. In certain constructions, the air for supporting combustion has been supplied to the working chamber under a pressure above atmospheric pressure, and in some cases, this air has been supplied in excess of the combustion requirements, the excess being utilized for scavenging the working chamber.

According to the invention the compressed air is introduced through pipes and a relatively large inlet valve in the cylinder head. The valve is operated by the compressed air itself. When the valve is arranged to move up and down, it is furthermore provided with a light spring, the strength of which only slightly exceeds the weight of the valve, so that the latter in normal position is only held lightly closed.

The motor having been sent into operation, slightly compressed air is supplied to the intake of the motor. The cylinder space having been brought into connection with the outer atmosphere by the uncovering of the slots by the piston the valve will be opened even in the case of slight compression, and the fresh air flows into the cylinder, expelling from the latter the remainder of the burnt gases still present. Upon the piston returning and closing the outlet slots the cylinder is quickly filled with compressed air of the same pressure as prevailing in the intake.

The compressed air is likewise utilized for the closing of the valve. For this purpose the valve stem is connected at its outer end with a movable member exposed to atmospheric pressure on its outer side, and on its inner side to the pressure prevailing in the air intake. The area of the inner surface of this member amounts to approximately one half of that of the valve.

Due to the large area of the valve as compared with that of said movable member, the latter will be pressed inwardly upon the opening of the valve. Upon the same air pressure being created in the cylinder by the closing of the outlet slots as exists in the intake, so that equal pressure prevails upon both sides of the valve, the pressure in the intake will now be effective only upon the inner surface of the said movable member forcing same outwardly and thus closing the valve. As will be seen from the above the control of the quicker operation of the valve, the operation of the turbine and accordingly the air compression is likewise increased. A valve controlled in the present manner does not require the strong spring customary hitherto and the response of the valve is quicker than when its motion is effected by cams and springs.

The compressed air control may, according to the invention, be so effectively embodied by calculation of the movable member connected with the valve that accessories of the engine, such for example as the fuel pump, and others may be operated by such member.

Scavenging of the cylinder by the compressed air effects a thorough interior cooling of the engine. The fuel is preferably introduced into the cylinder by means of a special pump after the piston has closed the slots.

As is well known great difficulties are met with in providing such a fuel pump, since with the high number of revolutions and the very negligible amounts to be supplied wear of the the pump causes an irregular supply of fuel. According to the invention a membrane pump is utilized without the employment of any kind of plunger, the operation of the pump being capable of regulation as desired. The membrane of this pump is given a reciprocatory movement as by means of a rod, whereby the volume of the pump chamber is increased or decreased, thus providing a pumping operation.

The invention is illustrated by way of example in the drawing, which shows a longitudinal section.

1 indicates the cylinder of the engine, in which the piston 2 is slidably located. The cylinder is provided with exhaust slots 3 governed by the piston 2. An air intake 4 runs into the head of the cylinder, this intake being connected with any suitable source of compressed air. At the mouth of the pipe 4 is located a valve seating 5, co-operating with a valve 6. The stem 7 of the valve is attached to a movable member of membrane 8 by the aid of a plate 9 closing up the membrane space. The spring 10 tends to lightly press the valve 6 upon the seating 5. With the plate 9 is connected at 11 a double-armed lever 12, which is fulcrumed at 13 upon a bearing bracket 14. The free arm 15 of the double-armed lever has a slot forming guide for the sliding head 16, the latter being connected by the rod 17 with a membrane pump 18. This membrane pump is of usual construction, the membrane being connected with the end of the lever 17 and the membrane disc tensioned in suitable manner in the pump casing. The pump 18 serves for suction and injection of the fuel into the cylinder 1.

The working method of the two-stroke engine is as follows:

Assuming that the piston 2 is located in the position shown in the drawing at the end of the working stroke, the air supplied from the turbine is led through the piping 4 into the cylinder, the valve 6 being simultaneously opened, as after the uncovering of the exhaust slots 3 the pressure within the cylinder is less than that above the valve 6 in the pipe 4. The fresh air upon entering drives the burnt gases forward and expels them through the slots 3. When the piston 2 commences the upward stroke and covers the slots 3 equal pressure prevails both in the cylinder and in the pipe 4, i. e., at this moment no flow of air occurs between the valve 6 and the valve seating. The valve is nevertheless closed, and is pressed firmly against the seating 5, the pressure of the air in the pipe 4 now acting upon the membrane 8, i. e., the closure plate 9 of the membrane is moved upwardly, taking with it the valve stem 7 and head 6, so that the valve is firmly closed. At the same time on account of the upward movement of the membrane plate 9 the lever 12 is rocked about the point 13, whereby the membrane pump 18 is operated and now injects fuel into the cylinder, where the fuel mixes with the air which has already been fed thereto, the mixture being ignited in the known manner. The stroke of the membrane pump 18 may be varied by adjustment of the sliding head 16 in the slot guide 15, due to the alteration in the length of the lever arm between the connecting point of the rod 17 with the sliding head 16 and the fulcrum 13.

What I claim is:

1. A two-cycle engine having a working chamber with an inlet for the admission of a fluid under pressure, a valve controlling said inlet, and a movable wall connected with said valve operatively and exposed on one side to the pressure of the ambient air at all times, while on the other side said movable wall is exposed permanently to the pressure prevailing on the admission side of said inlet.

2. A two-cycle engine having a working chamber with an inlet for the admission of a fluid under pressure, a valve controlling said inlet, and a movable member connected with said valve operatively and exposed on one side at all times to the pressure prevailing on the admission side of said inlet, while on the other side said wall is exposed to a substantially constant pressure.

3. A two-cycle engine having a working chamber with an inlet for the admission of a fluid under pressure, a valve controlling said inlet, an expansible and contractile casing the interior of which is in permanent communication with said inlet on the admission side, while the outside of said casing is exposed at all times to the pressure of the ambient air, and an operative connection between a movable portion of said casing and said valve.

4. A two-cycle engine having a working chamber with an inlet for the admission of a fluid under pressure, a valve controlling said inlet, a movable member operatively connected with said valve and exposed on one side to the pressure of the ambient air at all times, while on the other side said movable member is exposed permanently to the pressure prevailing on the admission side of said inlet, and a pump, operatively connected with said movable member, for delivering fuel to said working chamber.

5. A two-cycle engine having a working chamber with an inlet for the admission of a fluid under pressure, a valve controlling said inlet, a movable member operatively connected with said valve and exposed on one side to the pressure of the ambient air at all times, while on the other side said movable member is exposed permanently to the pressure prevailing on the admission side of said inlet, a pump for delivering fuel to said working chamber, and an adjustable operative connection from said movable member to said pump.

6. A two-cycle engine having a working chamber with an inlet for the admission of a fluid under pressure, a valve controlling said inlet, and a movable member operatively connected with said valve and having an effective area considerably smaller than that of the said valve, said member being exposed on one side at all times to the pressure prevailing on the admission side of said inlet valve, while on the other side said member is exposed permanently to the pressure of the ambient air.

In testimony whereof I have affixed my signature.

CHRISTIAN LORENZEN.